United States Patent [19]

Ogawa et al.

[11] 4,420,237

[45] Dec. 13, 1983

[54] EXPOSURE CONTROL SYSTEM

[75] Inventors: Yukio Ogawa, Kawasaki; Isao Harigaya; Tateo Yamada, both of Yokohama; Michio Hirohata, Inagi, all of Japan

[73] Assignee: Canon Kabushiki Kaisha, Tokyo, Japan

[21] Appl. No.: 450,745

[22] Filed: Dec. 17, 1982

Related U.S. Application Data

[63] Continuation of Ser. No. 331,796, Dec. 17, 1981, abandoned, which is a continuation of Ser. No. 119,494, Feb. 7, 1980, abandoned.

[30] Foreign Application Priority Data

Feb. 13, 1979 [JP] Japan .................................. 54-15880
Feb. 13, 1979 [JP] Japan .................................. 54-15881

[51] Int. Cl.$^3$ ............................................ G03B 7/093
[52] U.S. Cl. .................................. 354/458; 354/465; 354/476

[58] Field of Search .................. 354/23 D, 29, 30, 42, 354/49, 59, 60 R, 209

[56] References Cited

U.S. PATENT DOCUMENTS 4,024,551 5/1977 Tsujimoto ....................... 354/209 X
4,175,840 11/1979 Kittag ............................. 354/209 X
4,191,463 3/1980 Urano et al. ..................... 354/209 X

*Primary Examiner*—Michael L. Gellner
*Attorney, Agent, or Firm*—Toren, McGeady and Stanger

[57] ABSTRACT

A camera having an electromagnetically driven shutter provided with a counter capable upon counting a present number producing a signal. Each time the shutter is closed, the counted value is changed, while the period of actuation of the shutter is controlled to effect a predetermined fraction of an exposure, so that a continuous sequence of shots equal in number to that preset in the counter are taken automatically.

25 Claims, 4 Drawing Figures

EXPOSURE CONTROL SYSTEM

This is a continuation of application Ser. No. 331,796, filed Dec. 17, 1981 (now abandoned), which is a continuation of application Ser. No. 119,494, filed Feb. 7, 1980 (now abandoned).

BACKGROUND OF THE INVENTION

This invention relates to an exposure control system for cameras capable of making intentional double and multiple exposures on the same frame of film.

Many roll film cameras using spring-powered shutter mechanism also utilizes a device for energizing the shutter-operating spring when the film is advanced one frame after the frame exposure has been completed. Specifically, they employ so called self-cocking device.

In a camera having a self-cocking device, however, the shutter mechanism and film transporting mechanism are interlinked to each other. Hence, in order to impart to the camera the capability of superimposing a second exposure on the once exposed frame of film, that is, to produce a very complicated mechanism must be provided.

Generally, when the film winding lever is turned, the film is advanced one frame and the shutter mechanism is charged or coded. To superimpose a number of shots, it has been the common practice in the prior art to provide a special control mechanism that, upon actuation, permits the film to remain stationary and the film counter to stand still despite the operation of the film winding level. In addition to the necessity of furnishing a complicated control mechanism, this arrangement has the disadvantage that the necessary number of parts are increased and the cost of production of the camera is raised.

Moreover, with an automatic exposure control camera, when two or more shots superimposed while the automatic exposure mode is set, each shot admits a full exposure adjusted independently of the others, to the same frame of film. Hence, the larger the total number of shots superimposed, the more the frame will be overexposed.

SUMMARY OF THE INVENTION

It is one of the principal objects of the present invention to provide an exposure control system that enables intentional double and multiple exposures on the same frame of film while nevertheless being of simple structure and economically manufactured.

Another principal object of the present invention is to provide an exposure control system where one actuation of shutter release suffices to take a continuous sequence of a plurality of shots.

Another object of the present invention is to provide an exposure control system where actuating the shutter button only once for a short time allows one to expose a continuous succession of frames.

Another object of the present invention is to provide an exposure control system where when a plurality of shots are superimposed, the total sum of exposures furnishes a correct exposure, and where the proportion of each fraction of an exposure can be preset to a desired value.

According to one of the features of the exposure control system of the present invention, use is made of a shutter arrangement with an electromagnetic force as the drive source, so that the otherwise existing mechanical linkage between the shutter mechanism and the film transporting mechanism is removed, and so that the multiple-exposure control can be achieved by the provision of simple and inexpensive means.

According to another feature of the exposure control system of the present invention, use is made of a counter for counting one each time one exposure is taken. When the number of exposures counted has reached a manually preset value, the counter produces an output signal. Until then, the exposure process repeats in sequence. Thus, the only one actuation of the shutter release button leads to the performance of a continuous superimposition of two or more exposures on the same frame of film. If an arrangement is employed for advancing the film one frame after each exposure has been completed, pushing the shutter release button only once for a short time can automatically effect a continuous succession of frame exposures equal in number to that previously set by a dial or the like.

According to another feature of the exposure control system of the present invention, when carrying out a multiple-exposure, each shot is given that reduced exposure which is obtained by dividing the proper exposure by the total number of shots the photographer plans to superimpose so that the total sum of exposures always becomes proper.

According to another feature of the exposure control system of the present invention, during the multiple-exposure operation, each shot can be given a desired function of the proper exposure independently of the other fractions, thereby making it possible for the photographer to create a multiply exposed photograph of special effect.

According to another feature of the exposure control system of the invention, while a preset number of exposures are continuously being taken either on the same frame of film, or the individual frames of film, the remaining number of exposures in the continuous sequence is displayed to enable the photographer to see at a glance how many more shots have to be made.

These and other features of the invention are pointed out in the claims. Other objects and advantages of the invention will become evident from the following description when read in light of the accompanying drawings.

DESCRIPTION OF THE PREFERRED EMBODIMENTS

Figure 1:
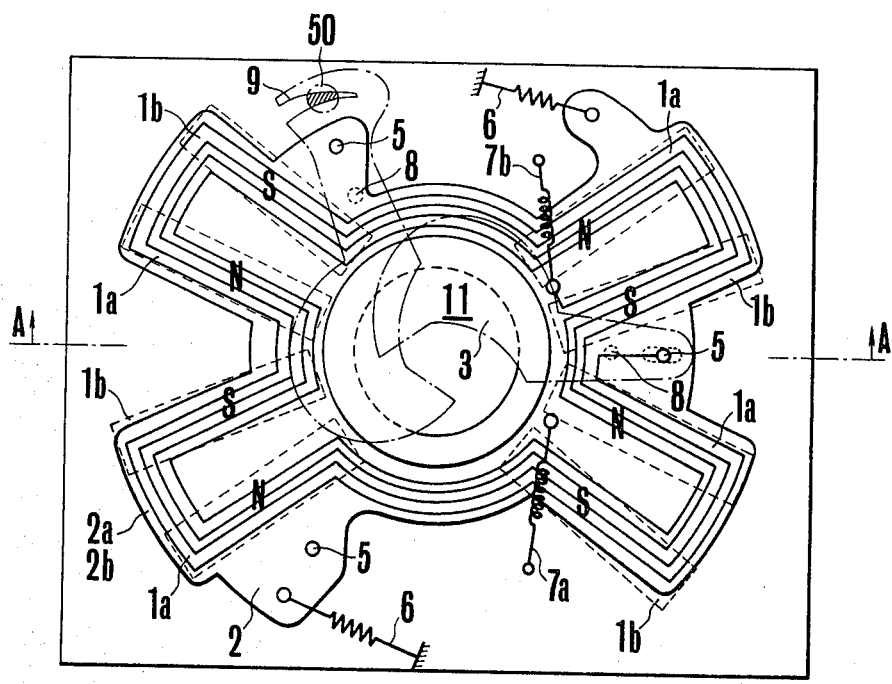
FIG. 1 is an elevational view showing an example of an electromagnetically operated shutter used in and to be controlled by an exposure control system according to the present invention.
Figure 2:
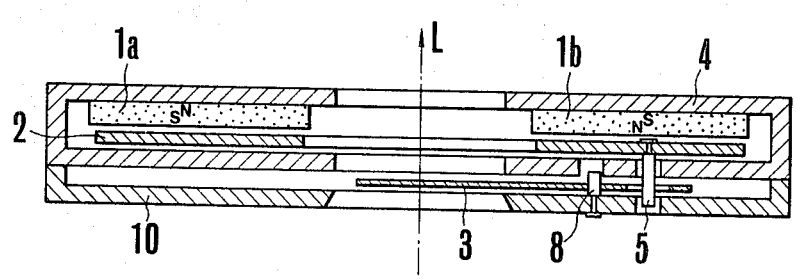
FIG. 2 is a sectional view taken along A—A line of the electromagnetically operated shutter of FIG. 1.

FIG. 1 shows an example of an electromagnetically driven diaphragm shutter for use in the exposure control system of the invention, and FIG. 2 shows an A—A section thereof. In FIGS. 1 and 2, the shutter includes a plurality of shutter blades 3 that also serve as the diaphragm blades of which the only two are shown (one of these two is provided with an auxiliary diaphragm to be described later). The blades are made of an opaque and non-conductive material such as thermoplastic or thermosetting resin. A sector ring 2 is made of a non-magnetic glass epoxy, plastic or other suitable insulator. Both the upper and lower surfaces of the section ring carry wiring in the form of conductive patterns 2a and 2b printed thereon and oriented to move the above described shutter blades 3 in response to fixed magnetic poles 1a and 1b. That is, the printed patterns 2a and 2b are arranged in the magnetic field of the fixed magnetic poles 1a and 1b to exert a force rotating the sector ring 3 according to Fleming's law. The sector ring 2 is urged by a return spring 6 in a direction to close the shutter blades 3, and normally holds the shutter blades 3 in the closed state. The shutter blades 3 are rotated about stationary shafts 8 affixed to a ground plate 10, while the driving force of this time is transmitted by pins 5 of conductivity fixed to the sector ring 2. It is to be noted that said pins 5 are fixedly mounted on the sector ring 2 by riveting or soldering means, and one of the plurality of pins 5 serves to play a role of electrical connection between the printed patterns on the opposite side of the sector ring. An auxiliary diaphragm arrangement 9 serves for restricting incident light onto a photosensitive element 50 and for exposure control. On the other hand, in order to cause a magnetic flux to penetrate the conductive printed patterns 2a and 2b, the plurality of fixed magnetic poles 1a and 1b are positioned in alignment with the printed patterns 2a and 2b. The fixed magnetic poles 1a and 1b are preferably permanent magnets magnetized in axial directions with respect to the aperture, and arranged along a circumferential direction with the orientation of their magnetic poles N and S alternating. For example, the pole 1a is oriented so that the N pole points upward, and the pole 1b is oriented so that the S pole points upward. It is to be noted in connection with FIG. 2 that a yoke 4 is provided for effective passage of the magnetic flux of the fixed magnetic poles 1a and 1b across the printed patterns 2a and 2b on the sector ring 2.

The operation of the above described electromagnetically driven shutter is as follows. When a release button is actuated, a drive circuit (FIGS. 3 and 4) is rendered operative, and a current flows from a first terminal 7a of coil to a second terminal 7b of coil. Then, since the printed patterns 2a and 2b lie in the magnetic field of the fixed magnetic poles 1a and 1b, those of the current components which flows in the radial directions of the printed patterns 2a and 2b exerts a force F1 of magnitude determined by Fleming's law in a tangential direction of the circle of the aperture opening. This force F1 rotates the sector ring 2 against the recovery force of the return spring 6, and the sector pins 5 move the shutter blades 3, thus increasing the size of the opening defined by the shutter blades 3, while light is entering through the auxiliary diaphragm 9 to the photosensitive element 50. When the amount of light incident thereon has reached a predetermined level, the current supply from the driving circuit to the printed patterns 2a and 2b through the terminals 7a and 7b of coil is cut off. Then the force of the return spring 6 rotates the sector ring 2 in the reverse direction, and the shutter blades 3 are closed.

Figure 3:
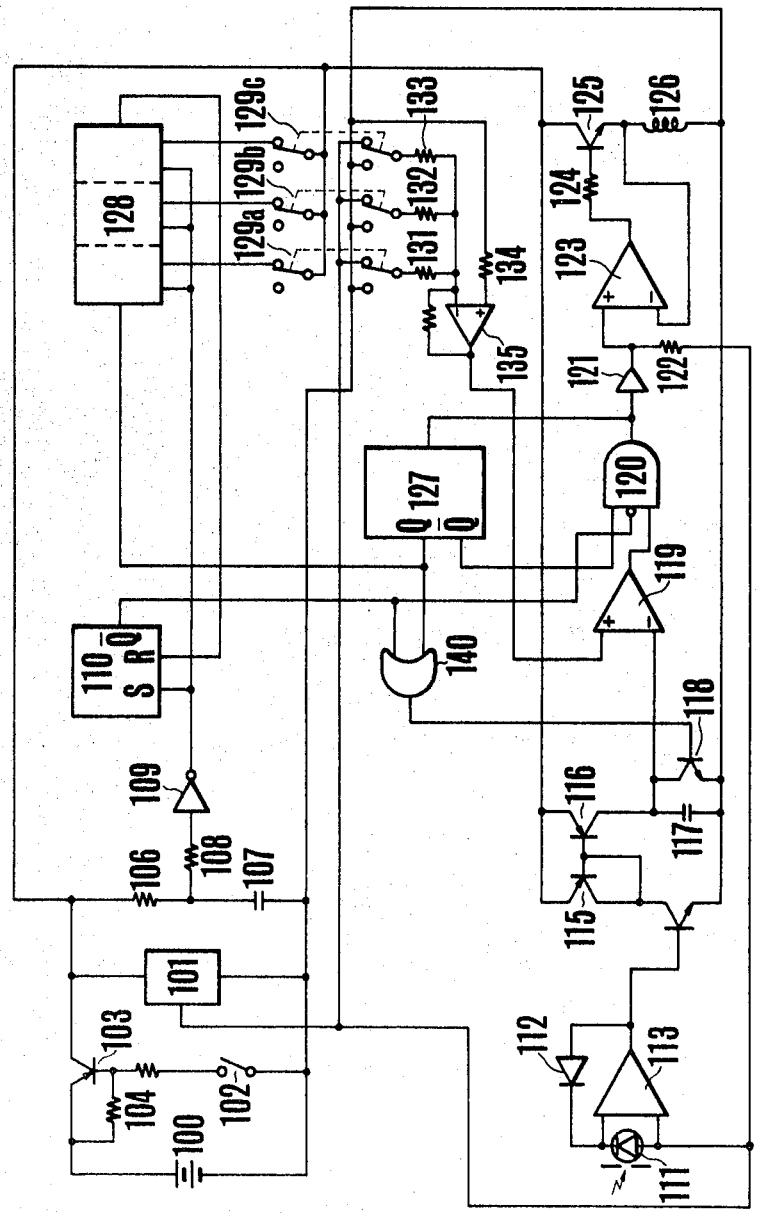
FIG. 3 is an electrical circuit diagram of one embodiment of an exposure control system according to the present invention.

FIG. 3 shows one embodiment of a control circuit of the exposure control system according to the present invention. Here, member 100 is an electrical power source or battery; member 102 is a normally open releases switch arranged to be closed when a release button is depressed; member 103 is a transistor responsive to the closure of the switch 102 for conduction; and element 101 is a constant voltage circuit. A resistor 106 and a timing capacitor 107 form a time constant or timer circuit. The control circuit also includes a resisor 108 an inverter 109, a flip-flop circuit 110 and a substraction counter 128. An exposure controlling photosensitive element 111, for example, silicon photo-cell (SPC) is positioned to receive light from an object being photographed through the auxiliary diaphragm of FIG. 1. A light-metering operational amplifier form a logarithmic compression circuit together with a diode 112. An integrating capacitor 117 is charged by a current corresponding to the brightness information from the light metering circuit and other photographic information through a transistor 116. A switching transistor 118 is connected across the integrating capacitor 117. A comparator 119 forms an output which is connected through an AND gate 120 and a buffer 121 to a second comparator 123. A transistor 125 controls a coil 126 for driving the shutter. Element 127 is a timer circuit. Switches 129a, 129b and 129c set the number of shots the operator desires to superimpose, the number of these switches being equal to that of the number of bits in substraction counter 128. In FIG. 3, the number of bits is shown as three, but it may be optional. Also included are an operational amplifier 135 or an OR gate 140.

The operation of the circuit of FIG. 3 is as follows. The operator first sets a desired number of multiple exposures by operating the switches 129a, 129b and 129c. Then, the actuation of the shutter release turns on the switch 102, and one pulse is produced by the time constant circuit comprised of the resistor 106 and capacitor 107, the resistor 108 and inverter 109. This pulse is applied to set the flip-flop 110 which results in its $\bar{Q}$ output becoming low ("L"). This "L" signal along with a low from output $\bar{Q}$ from timer 127 (to be described) causes the OR gate 140 to turn off the transistor 118. At this time the inverting input terminal (−) of the comparator 119 goes low and the output of the comparator 119 changes to "H". Since at this time the Q output of the timer circuit 127 is also high ("H") as it is so set, the output of the AND gate 120 changes to "H". This "H" level signal is then applied is then applied through the buffer 121 to the non-inverting input terminal (+) of the comparator 123. At this time the inverting input terminal (−) of the comparator 123 is "L", so that the output of the comparator 123 changes to "H" at which the transistor 125 is turned on. Thus, a drive current flows to the coil 126 to drive the shutter.

The pulse from the inverter 109 is also fed to the subtraction counter 128 to read in that number of multiple-exposures set by the switches 129a, 129b and 129c. Further, the outputs of these switches 120a, 129b, 129c are applied through respective resistors 131, 132 and 133 to the operational amplifier 135 in which they are added. Thus, the reference voltage at the non-inverting input terminal of the comparator 119 is adjusted by the output of the amplifier 135 to a value corresponding to the above-identified number of exposures. The value of this reference voltage is predetermined to be Vo/n where Vo is the voltage occurring when only one shot is given a full exposure and n is the number of shots to be superimposed.

When the current flows through the drive coil 126, the shutter blades 3 start to open driven by the electromagnet force, and at the same time the auxiliary diaphragm starts to open. As the amount of light incident upon the photosensitive element 111 is increased, the output of the photosensitive element 111 is integrated by the light metering circuit and the capacitor 117, provided that the transistor 118 is turned off by the Q output of the timer circuit 127 being "L". When the charge on the capacitor 117 has reached a value equal to the reference voltage appearing at the non-inverting input of the comparator 119, the output of the comparator 119 changes from "H" to "L", causing the non-inverting input of the comparator 123 to become "L" through the AND gate 120 and buffer 121, and therefore causing the output of the 123 to change to "L". Thus, the transistor 125 is turned off and cuts off the current supply to the coil 126. The return spring now closes the shutter blades.

When the output of the comparator 119 changes to "L" as mentioned, the "L" signal is applied to the timer circuit 127 through the AND gate 120, so that the Q output of the timer circuit 127 is changed from "L" to "H". This "H" signal is applied through the OR gate 140 to turn on the transistor 118, causing the integrating capacitor 117 to be short-circuit and therefore discharging the charge on the capacitor. The Q output "H" from the timer circuit 127 is applied to the substraction counter 128 where one is substracted from the number previously set in the counter.

The timer circuit 127 is constructed to invert and produce a low at the output Q at the termination of a given time interval. The latter is predetermined by taking into account the period necessary to complete the closing operation of the shutter from the moment at which the closing control signal (the "L" output of the comparator 119) has been produced. This low at the output Q of timer circuit 27 causes the transistor 118 to be turned off again. From this time onward, the foregoing sequence repeats to superimpose the second slot on the once exposed frame of film. Such procedure repeats itself until the individual bits of the substraction counter 128 become "O", that is, "L". As the exposure is repeated the corresponding number of times to that preset by the switches 129a to 129c, when the last cycle of opening and closing operation of the shutter has been completed, the subtraction counter 128 produces a "reset" signal which is applied to the "R" terminal of the flip-flop 110, and the Q̄ output of the flip-flop 110 becomes "H". This signal turns the transistor 118 on so that the charge on the capacitor 117 is discharged. Since this Q̄ output after having been inverted is also applied to the AND gate 120, it is from this time that no more current supply to the shutter drive coil 126 follows so long as the release switch 102 is actuated for closure again, and the shutter remains closed.

As has been shown in connection with the first embodiment of the control circuit, the exposure control system according to the present invention allows for the performance of the opening and closing operation of the shutter by the electromagnetic drive means independently of the film winding operation. This makes it possible to operate the camera optionally in the normal exposure mode where a single frame of film is exposed only once, and the multiple exposure mode where two or more shots are superimposed on the same frame of film. To take a number of shots the operator plans to superimpose, the number is manually set. It is also possible to operate the multiple exposure mode in a different manner such that every shot is taken by each release actuation, or that all the shots continuously succeed one upon another after only one release actuation. Furthermore, each shot is given that fraction of the proper exposure which is obtained by dividing by it by the total number of shots to be superimposed to that the double- or multiply-exposed frame is always properly exposed. Those features are very advantageous in managing the camera.

Figure 4:
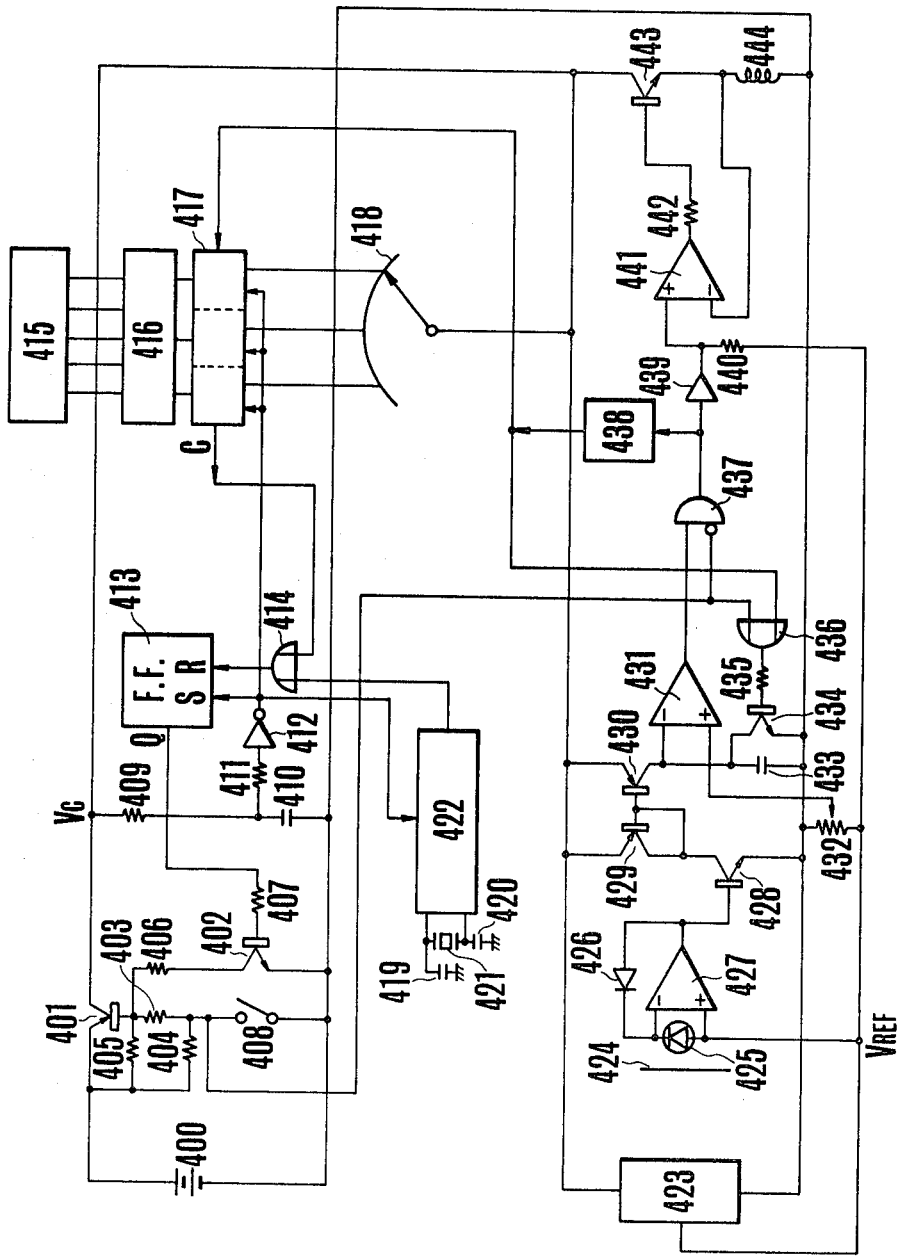
FIG. 4 is an electrical circuit diagram of another embodiment of the present invention.

FIG. 4 shows a second embodiment of a control circuit of the multiple exposure control system according to the present invention. This circuit includes an electrical power source or battery 400, is normally open release switch 408 arranged to be turned on when the release button is depressed, a transistor 402 controlling that circuit, and resistors 403 to 406 forming part of the circuit. When the switch 408 is turned on, the transistor 401 is rendered conductive to supply electrical power to all the circuits, and the transistor 402 is then turned on by the Q output of the flip-flop to be described later to hold the power supply. Resistors 409 and 411, a capacitor 410 and an inverter 412 form a power-up clear circuit responsive to the start of power supply for actuating a counter 417, a flip-flop 413 and a frequency divider 422. The flip-flop circuit 431 holds the power supply to the circuits during the sequence of multiple-exposures. A quartz-crystal oscillator 421 forms an oscillation circuit together with capacitor 419 and 420 whose output pulses after having been divided in frequency by the frequency divider 422 are applied to an OR gate 414 to function as a long interval timer. A counter 417 serves for counting the number of shots when in the multiple exposure mode. A display decoder 416 converts the content of the counter 417 to codes for 7-segment display, and its output drives a display device 415. A digital switch 418 sets the number of shots to be superimposed. A constant voltage circuit 423 supplies a reference voltage to operational amplifiers and the like. A photosensitive element 425 serves for measuring the brightness of an object to be photographed and uses a silicon photo-cell or the like. A filter 424 varies the intensity of light incident upon the photosensitive element with variation of film sensitivity information. The circuit includes a log diode 426 and operational amplifier 427 of a light measuring circuit, transistors 428 to 430, and a capacitor 433 which is charged by the current of the transistor 430. A transistor 434 for shortcircuiting and opening the path between the poles of the condenser 133 is controlled by a resistor 345 and an OR gate 436. The transistor 434 is ON when the release switch 408 is OFF, or when a timer 438 is in operation, thereby the capacitor 433 is prevented from charging. A comparator 431 has an inverting input terminal to which the voltage of the condenser 433 is applied and is non-inversion input to which the reference voltage of the constant voltage circuit 423 is applied after having been divided by a variable resistor 432. The output of the comparator 431 is applied to an AND gate 437 having an output which is applied to actuate the timer 438. The system further includes a buffer 439, an operational amplifier 441, and resistors 440 and 442. Together these parts form a shutter drive circuit for controlling a transistor 443 to open and close the current flow to a coil 444 of the electromagnet shutter and perform the opening and closing operation of the shutter blades.

The operation of the circuit of FIG. 4 is as follows. In the case of the multiple-exposures, the desired number of shots is set in the digital switch 418. Now assuming that, for example, triple-exposures are to be made on the same frame of film, then the switch 418 is set to 3. What to do next is to determine how the triple-exposures are weighted individually according to the intention of the photographer, as 30%:30%:40%, 10%:10%:80%, or so on. These weights are set prior to taking the corresponding shots. The following refers to the case where the three shots are made at respective reduced exposures to 20%, 30% and 50% of the full exposure. Settings of the exposure weights are performed one at a time by the variable resistor 432.

When the release button is depressed, the switch 408 is turned on so that the transistor 401 of the electrical power supply holding circuit is rendered conductive to supply the all circuits with electrical power from the battery 400. Such closure of the switch 408 also produces one pulse signal according to the time constant dependent upon the resistor 409 and capacitor 410 through the resistor 411 and inverter 412. Responsive to this pulse signal, the flip-flop circuit 413 sets itself, and at the same time the content set by the digital switch 418 is read in the counter 417 at the individual bits thereof. That is, in this instance, the content of the counter 417 is set to 3. The above-described pulse is also applied to the frequency divider 422 as a reset signal, and the frequency divider is reset to 0. The number 3 representing the content of the counter 417 is converted to 7-segment LED drive signals by the decoder 416, and these signals drive the 7-segment LED display 415 for display of a digit "3". The presentation of the display of the digit "3" not only implies that the multiple exposures go on, but also indicates how many more shots remain to be taken.

On the other hand, since the switch 408 is ON, and the output of the timer 438 is "L", the output of the OR gate 436 becomes "L". Therefore, the transistor 434 is turned off. The photosensitive element 425 receives light from the object through the auxiliary diaphragm and filter 424 and its photoelectric output is logarithmically compressed by the light-metering circuit comprising the diode 426 and operational amplifier 427. This is elongated by the transistor 428 so that the collector current of the transistor 413 becomes proportional to the output of the photosensitive element. This current is used in charging the capacitor 433. The comparator 431 compares the voltage across the capacitor 433 with the reference voltage at the variable resistor 432. That is, the nearer the reference voltage is to 0, the shorter the shutter time is. Conversely, the higher the reference voltage, the longer the shutter time is. The output of the comparator 431 is applied to the AND gate 437 whose output is maintained at "H" from the moment at which the switch 408 has been closed to the moment when the capacitor 433 is charged to a voltage above the reference voltage. This "H" signal is applied through the buffer 439 and operational amplifier 441 to turn on the transistor 443, so that the coil of the electromagnetic shutter is supplied with current and the shutter is moved. Then, when the output of the AND gate 437 changes from "R" to "L", the shutter drive circuit turns off the transistor 443. Hence, the current supply to the shutter drive coil is cut off and the shutter is closed. In synchronism with the falling edge of the change of the output of the AND gate 437 of the timer 438 changes from "L" to "H", at which the counter 417 substracts one from 3, leaving the result of 2 therein. The period of actuation of this timer 438 is previously determined by talking into account the additional time necessary to complete the closing operation of the shutter, and may be made variable. When the switch 408 is turned on to render the transistor 401 conductive, the slow timer comprised of the quartz-crystal oscillator circuit 119 to 121 and frequency divider circuit 422 is actuated.

To make a second exposure, the operator needs first to re-adjust the variable resistor 132 for setting 30% of the full or proper exposure. Then the shutter button is depressed. This is followed, as mentioned, by the steps of turning on the switch 408, turning off the transistor 434 through the OR gate 436, and charging the capacitor 433 to a voltage dependent upon the object brightness. In this second shot, the exposure time is adjusted in accordance with the correction factor representing 30% in weight. In synchronism with the falling edge of the shutter opening control signal, the timer 438 is triggered to produce an output which is applied to the counter 417. The latter counts back from 2 to 1. This content of the counter is displayed by the device 415, informing the operator of the fact that the remainder number of shots to be superimposed is 1. Then, prior to taking a third shot, the variable resistor 432 has to be re-adjusted once more, for 50% is assigned thereto. After that, when the shutter button is depressed, the shutter is opened and closed to effect 50% exposure. By the shutter opening control signal, the counter 417 is caused to advance from 1 to 0. When the content of the counter 417 has reached 0, a reset signal of H level is produced from the terminal (C) of the counter and is applied through the OR gate 414 to the reset terminal of the flip-flop 413, thereby the flip-flop 413 is reset. When the Q terminal of the flip-flop 413 is changed from "H" to "L", the transistor 102 is turned off to terminate the duration of conduction of the transistor 401, and the self-retention is released.

As a result, the three shots have been superimposed in an exposure value ratio of 20%, 30% and 50%. It is to be noted that since the reset signal from the counter 417 represents the termination of duration of the multiple-exposure operation, this signal may be used in controlling the actuation of a drive circuit for the film winding electric motor (not shown). In this case, a signal occurring when the cycle of film winding operation has been completed may be utilized as a carry signal which is applied to the OR gate 414. It is also possible to utilize the signal from the timer 438 as an actuating signal for the data printing device, or as a trigger signal for the flash device.

Although the display device warns the operator of whether or not an exposure is left to be taken, if he were not aware of it, the circuit would continue to operate while electrical energy is wastefully used up. To avoid this, the circuit of the present invention contemplates the use of the quartz-crystal oscillator 421 and frequency divider 422 in the form of a long interval timer which is rendered operative when in making multiple-exposures. After an appropriate time from the initiation of the first of a number of shots to be superimposed has passed, this timer produces an output by which the electrical power supply is automatically released, i.e., turned off.

As described, in the second embodiment of the control circuit according to the present invention, the number of intentional multiple-exposures on the same frame of film to be made can be preset at any number, and the extent to which the sequence of shots has advanced is displayed. Moreover, each shot can be given a reduced exposure as the reduction rate is manually preset. Thus, the exposure control system of the invention enables the photographer to make multiple-exposures while producing a special effect on the multiply exposed frame of film.

What is claimed is:

1. An exposure control system including:
   (a) electromagnetically operated shutter means operating under the action of an electromagnetic force and positioned to block and unblock light entering a photo-taking lens;
   (b) a shutter drive circuit responsive to an actuating signal for opening, and, after a predetermined time, closing said electromagnetically operated shutter;
   (c) means for setting a number of exposures;
   (d) a counter or counting each time said electromagnetically operated shutter means is closed after a an actuating signal and for producing a closing signal upon having counted the predetermined number set by the exposure number setting means;
   (e) a flip-flop circuit for holding said shutter drive circuit in an operative position from the time of the actuating signal to that at which said counter produces the predetermined signal; and
   (f) a timer circuit for preventing actuation of said shutter drive circuit from the initiation of a closing of said electromagnetically operated shutter to the termination of the closing thereof.

2. An exposure control system according to claim 1, further comprising setting means for optionally selecting distribution of the exposure amount for each of the multiple exposures.

3. An exposure control system according to claim 2, further comprising a release switch for closing in response to the camera release to supply power to the circuits, and means for holding a power source, said holding means maintaining the power supply condition until the set number of exposures is finished after the release switch opens.

4. An exposure control system according to claim 1, further comprising means for indicating the number of exposures set by the exposure number setting means.

5. An exposure control system according to claim 4, wherein the indicating means serves for indicating the remaining number of exposures.

6. A system as in claims 1, 3, 4 or 5, wherein the number of exposures set is equal to N, and wherein said shutter drive circuit includes means responsive to the object brightness for establishing a time T suitable for one full exposure to close the electromagnetically operated shutter and for closing the shutter following an opening after a time T/N.

7. An exposure control system according to claim 1, wherein said electromagnetically operated shutter means is associated with diaphragm means.

8. An exposure control system according to claim 7, further including auxiliary diaphragm means for changing the amount of incident light therethrough in response to movement of at least one shutter blade of said electromagnetically operated shutter, and means for sensing the amount of light through said auxiliary diaphragm means.

9. An exposure control system according to claim 8, further comprising means for controlling the time from the moment at which said shutter drive means has driven the electromagnetically operated shutter to open to the moment at which said shutter is to be closed is controlled so that the amount of light incident through said auxiliary diaphragm means is made constant.

10. An exposure control system according to claim 7, further including means for sensing the brightness of an object to be photographed, and where the period of actuation of said shutter drive circuit from opening to closing of the electromagnetically operated shutter is determined by sid object brightness sensed.

11. An exposure control system according to claim 1, wherein said counter produces a signal when a predetermined number has been counted to add or to subtract, whereby said signal cuases the film to be able to advance one frame.

12. An exposure control system according to claim 11, wherein said electromagnetically operated shutter also serves as diaphragm means, and further including auxiliary diaphragm means for varying the amount of light passing therethrough in response to movement of at least one shutter blade of said shutter means, and means for sensing the amount of incident light passing through said auxiliary diaphragm means.

13. An exposure control system according to claim 12, wherein the time from the moment at which said shutter drive means has driven the electromagnetically operated shutter means to open to the moment at which said shutter means is caused to be closed is adjusted so that the amount of incident light passing through said auxiliary diaphragm means is made constant, and the multiplication of this incident light amount by the predetermined number for said counter corresponds to a proper exposure value.

14. An exposure control system according to claim 1, further including a display device connected through a decoder to the output of the counter.

15. An exposure control system according to claim 1, wherein the period of actuation of said timer circuit is variable.

16. An exposure control system operating in response to a release switch and the brightness of an object, comprising:
   (a) electromagnetically operated shutter means for operating in response to the action of an electromagnetic force as the driving source and positioned to block and unblock light entering through a photo-taking lens;
   (b) a shutter drive circuit for opening, and, after a predetermined time based on the brightness of the object causing said electromagnetically operated shutter to be closed;
   (c) a counter for counting each time said electromagnetically operated shutter means is closed after the release switch has been thrown and, upon having counted a predetermined number, producing a predetermined signal;
   (d) a timer circuit for intermittently actuating the shutter drive circuit, said timer circuit being arranged for preventing the actuation of the shutter drive circuit for a given time from initiation to finish of closure of the electromagnetically operated shutter means and for actuating the shutter drive circuit in an operative position;
   (e) a gate circuit for sustaining said shutter drive circuit in an operative position for a time from the throwing of the release switch to the release thereof; and
   (f) maintaining means for maintaining power to the exposure control system from the time of the release switch being thrown to the time the counter produces the predetermined signal.

17. An exposure control system according to claim 16, wherein said electromagnetically operated shutter means is associated with diaphragm means.

18. An exposure control system according to claim 17, further including auxiliary diaphragm means for changing incident light amount in response to movement of at least one shutter blade of said electromagnetically operated shutter, and means for sensing the amount of light passing through said auxiliary diaphragm means.

19. An exposure control system according to claim 18, wherein the time from the moment at which said shutter drive means has driven the electromagnetically operated shutter to open to the moment at which said shutter is to be closed is controlled so that the amount of light incident through said auxiliary diaphragm means is made constant.

20. An exposure control system according to claim 17, further including means for sensing the brightness of an object to be photographed, and for determining where the period of actuation of said shutter drive circuit from opening to closing of the electromagnetically operated shutter means on the basis of the brightness sensed.

21. An exposure control system according to claim 16, wherein said counter produces a signal when a predetermined number has been counted to add or to subtract, whereby said signal causes the film to advance one frame.

22. An exposure control system according to claim 21, wherein said electromagnetically operated shutter also serves as diaphragm means, and further including auxiliary diaphragm means for varying the amount of light passing therethrough in response to movement of at least one shutter blade of said shutter means, and means for sensing the amount of incident light passing through said auxiliary diaphragm means.

23. An exposure control system according to claim 22, further comprising means for controlling the time from the moment at which said shutter drive means has driven the electromagnetically operated shutter means to open to the moment at which said shutter means is to be closed is adjusted so that the amount of incident light entering through said auxiliary diaphragm means is made constant, and means for multiplying the amount of incident light by the predetermined number in said counter corresponding to a proper exposure value.

24. An exposure control system according to claim 16, further including a display device connected through a decoder to the output of said counter.

25. An exposure control system according to claim 16, further comprising:
a long-time timer circuit which releases the maintaining of power to the exposure control system by the maintaining means with its output a predetermined time after the time of the actuating signal.

* * * * *